United States Patent
Kozlowski et al.

(10) Patent No.: US 8,920,019 B2
(45) Date of Patent: Dec. 30, 2014

(54) METHOD AND APPARATUS FOR MAKING FOOD PRODUCTS

(75) Inventors: Eugene J. Kozlowski, Medina, OH (US); Glenn F. Brasdovich, Olmsted Township, OH (US); Kenneth W. Bair, Akron, OH (US)

(73) Assignee: Vita-Mix Corporation, Cleveland, OH (US)

( * ) Notice: Subject to any disclaimer, the term of this patent is extended or adjusted under 35 U.S.C. 154(b) by 710 days.

(21) Appl. No.: 12/460,273

(22) Filed: Jul. 17, 2009

(65) Prior Publication Data

US 2011/0013477 A1      Jan. 20, 2011

(51) Int. Cl.
| | | |
|---|---|---|
| *A47J 31/44* | (2006.01) | |
| *B01F 7/16* | (2006.01) | |
| *A47J 43/042* | (2006.01) | |
| *B01F 7/00* | (2006.01) | |
| *B01F 9/12* | (2006.01) | |
| *B01F 11/00* | (2006.01) | |
| *A47J 43/044* | (2006.01) | |

(52) U.S. Cl.
CPC ............. *B01F 7/1605* (2013.01); *A47J 43/042* (2013.01); *B01F 7/00333* (2013.01); *B01F 9/12* (2013.01); *B01F 11/0022* (2013.01); *A47J 2043/04463* (2013.01); *B01F 2215/0014* (2013.01); *B01F 2215/0021* (2013.01)
USPC ............................. 366/199; 366/203; 366/207

(58) Field of Classification Search
CPC ............ A47J 43/044; A47J 2043/0449; A47J 43/0705; A47J 43/082; A47J 43/0755; B01F 11/0022; B01F 7/1605
USPC .......... 366/199, 200, 201, 204, 206, 207, 203
See application file for complete search history.

(56) References Cited

U.S. PATENT DOCUMENTS

| | | | |
|---|---|---|---|
| 1,946,771 A | 2/1934 | Strongson | |
| 2,020,450 A | 11/1935 | Andis | |
| 2,294,489 A | 9/1942 | Terry | |
| 2,324,179 A | 7/1943 | Michael Srob | ............... 258/108 |
| 4,893,939 A * | 1/1990 | Burk et al. | ..................... 366/224 |
| 5,962,060 A | 10/1999 | Farrell | .......................... 426/565 |
| 2002/0189460 A1 | 12/2002 | Brown et al. | .................. 99/275 |
| 2008/0223225 A1* | 9/2008 | Boozer et al. | .................. 99/485 |

FOREIGN PATENT DOCUMENTS

EP      0 092 857      2/1983      ............... A21C 1/14

OTHER PUBLICATIONS

International Search Report (3 pages—dated Oct. 14, 2010).
European Office Action (Application No. 10 727 180.1) (6 pages—dated Jun. 6, 2013).
International Preliminary Report on Patentability (International Application No. PCT/US2010/001565) (7 pages—Date of issuance of report Jan. 17, 2012).

* cited by examiner

*Primary Examiner* — Tony G Soohoo
(74) *Attorney, Agent, or Firm* — Renner, Kenner, Greive, Bobak, Taylor & Weber

(57) ABSTRACT

A machine (10) for mixing a food product in a container includes a container holder (38) having an axis and adapted to receive a container. An agitator (30) is rotated by a motor (22) on an axis and is positioned above the container holder (38). A motor (47) moves the container holder (38) upwardly to selectively position the agitator (30) in the container with the axis of rotation of the agitator (30) being displaced from the axis of the container holder (38). A motor (45) can rotate the container holder (38) on its axis while the agitator (30) is in the container.

16 Claims, 6 Drawing Sheets

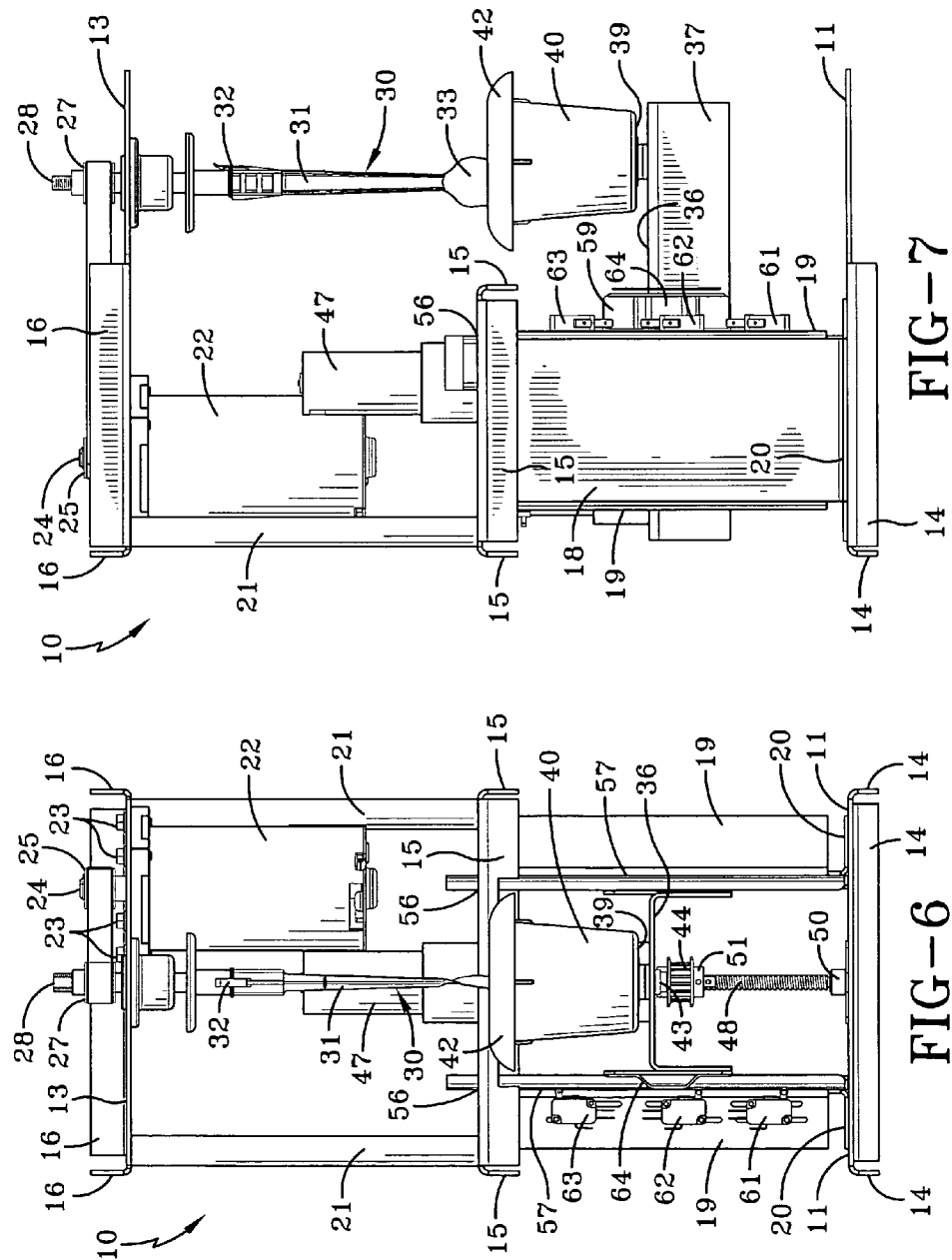

METHOD AND APPARATUS FOR MAKING FOOD PRODUCTS

TECHNICAL FIELD

This invention relates to a method and apparatus for making food products such as soft serve products, frozen drinks or the like which are often eaten with a spoon. More specifically, this invention relates to a device which will automatically mix foods and other condiments placed in a cup or other container.

BACKGROUND ART

Fast food and similar establishments often serve semi-frozen drinks, such as soft serve, smoothies or the like, which consist primarily of an ice cream-like product and other condiments selected by the customer. Traditionally, such a product is prepared and mixed in a cup or other container by a customer service employee of the establishment in a machine. The machine is provided with a spinning, rod-like agitator which the user manually positions in the food in the cup to mix the same. In order to properly mix the ingredients, the user is usually required to move the cup up and down, and often circularly, in order to assure that all of the product is properly mixed. However, such is not only tedious procedure requiring the time of the employee who could better use the time to be waiting on the next customer, but also oftentimes the resulting drink is not fully or properly mixed. In addition, if the user is not extremely attentive, the spinning agitator can engage the bottom and/or sides of the cup as it is being moved by the user potentially damaging or rupturing the same thereby destroying the integrity of the food product.

As a result, some attempts have been made to automate the mixing process. In these situations, the user could add the ingredients of his choice to the cup and then places the cup in the machine below the agitator. Upon activation of the machine, the spinning agitator moves up and down in the cup in an attempt to mix the ingredients. While such machines will normally prevent damage to the cup, they often do not completely mix the ingredients as the agitator will not mix the ingredients located in the periphery of the cup.

The need exists, therefore, for a machine which can be operated to fully mix the ingredients in a cup without damage to the cup.

DISCLOSURE OF THE INVENTION

It is thus an object of the invention to provide a device, and its method of operation, which utilizes an agitator to efficiently and automatically mix the food ingredients in a container.

It is an object of one aspect of the invention to provide a method and device, as above, which positions the agitator in the container displaced from the axis thereof to more efficiently mix the ingredients in the container.

It is an object of another aspect of the invention to provide a method and device, as above, in which the container rotates to more efficiently mix the ingredients in the container.

These and other objects of the present invention, as well as the advantages thereof over existing prior art forms, which will become apparent from the description to follow, are accomplished by the improvements hereinafter described and claimed.

In general, in accordance with one aspect of the invention, an apparatus for mixing a food product in a container includes a container holder having an axis and adapted to receive the container. An agitator is rotatable on an axis and is positioned above the container holder. The container holder is moveable upwardly so that the agitator is selectively positioned in the container with the axis of rotation of the agitator being displaced from the axis of the container holder.

In accordance with another aspect of the invention, an apparatus for mixing a food product in a container includes a container holder adapted to receive the container. A rotatable agitator is positioned above the container holder. The container holder is moveable upwardly so that the agitator is selectively positioned in the container. The container holder is also rotatable while the agitator is in the container.

These aspects, when combined, provide an apparatus for mixing a food product in a container including a container holder having an axis and adapted to receive the container. An agitator is rotatable on an axis and is positioned above the container holder. The container holder is moveable upwardly so that the agitator is selectively positioned in the container with the axis of rotation of the agitator being displaced from the axis of the container holder. The container holder is also rotatable while the agitator is in the container.

One aspect of a method of making a food product in a container using an agitator having an axis of rotation includes the steps of placing the container in a container holder having an axis, moving the container holder toward the agitator such that the agitator enters the container with its axis of rotation displaced from the axis of the container holder, and rotating the agitator while in the container.

Another aspect of the disclosed method of mixing a food product in a container with an agitator includes the steps of placing the container in a container holder, moving the container holder toward the agitator such that the agitator enters the container, rotating the agitator while in the container, and selectively rotating the container holder while the agitator is rotating.

The aspects of these methods, when combined, provide a method of mixing a food product in a container with an agitator having an axis of rotation including the steps of placing the container in a container holder having an axis, moving the container holder toward the agitator such that the agitator enters the container with its axis of rotation displaced from the axis of the container holder, rotating the agitator while in the container, and selectively rotating the container holder while the agitator is rotating.

A preferred exemplary machine for mixing a food product, and its method of operation, is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 6 is a somewhat schematic front elevational view of the mixing machine in the position shown in FIG. 2.

FIG. 7 is a somewhat schematic left side elevational view of the mixing machine in the position shown in FIG. 2.

PREFERRED EMBODIMENT FOR CARRYING OUT THE INVENTION

Figure 1:
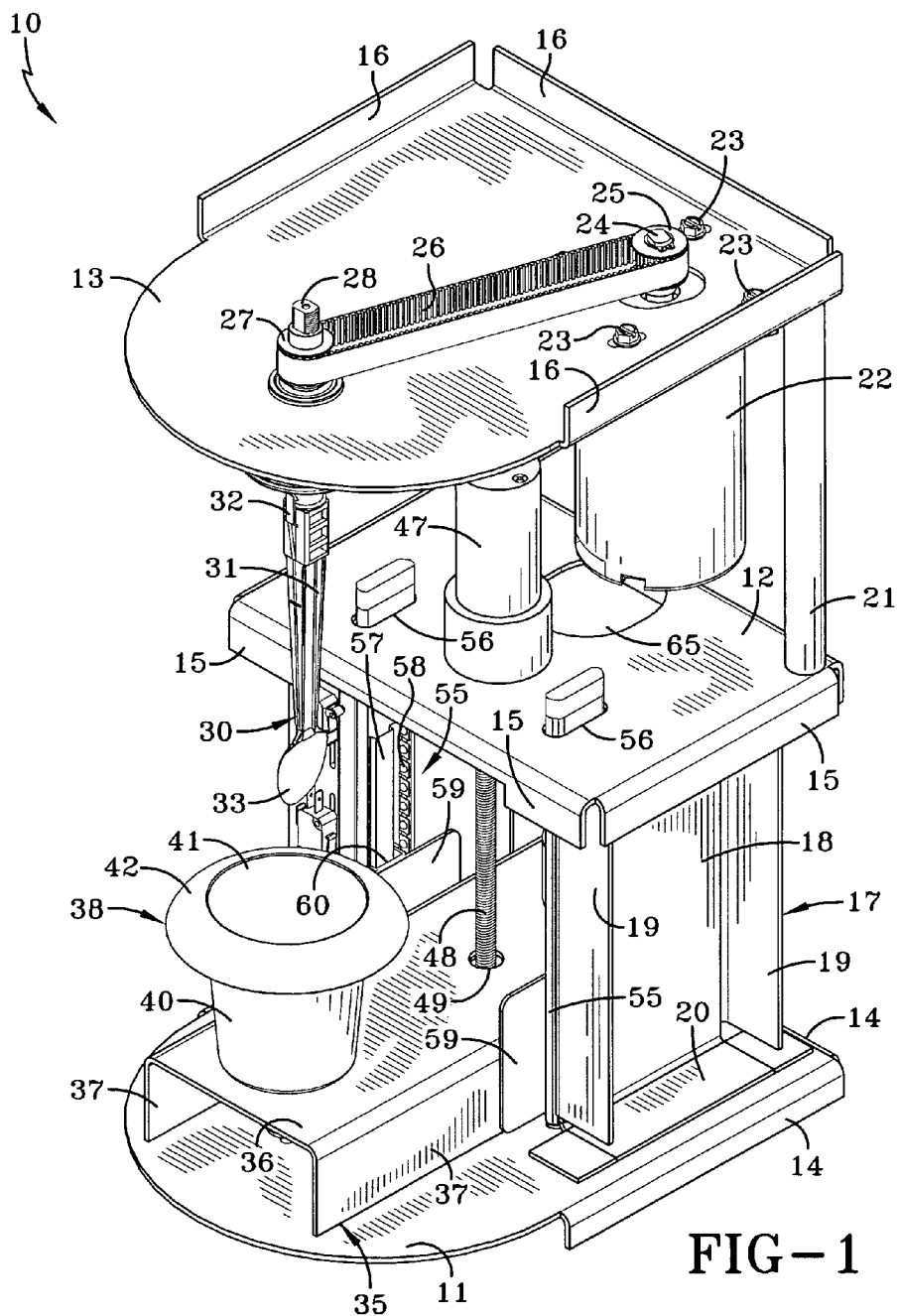
FIG. 1 is a somewhat schematic top, front, right side perspective view of a mixing machine made in accordance with the present invention and shown in its at rest position.

A food mixing machine made in accordance with the present invention is generally indicated by the numeral 10. For ease of depicting the components of machine 10, it is shown without a housing which would otherwise cover the top, rear, and sides of machine 10 leaving the front thereof open. Machine 10 includes a bottom plate 11, an intermediate plate 12 and a top plate 13. Bottom plate 11 is provided with downwardly directed flanges 14 at the sides and rear thereof, intermediate plate 12 is provided with downwardly directed flanges 15 at the sides and rear thereof as well as partially along its front, and top plate is provided with upwardly directed flanges 16 at the sides and rear thereof. Flanges 14, 15 and 16 are adapted to receive and carry the housing (not shown), as previously described, in a conventional fashion.

Intermediate plate 12 is carried spaced from bottom plate 11 by opposed box frames generally indicated by the numeral 17 and positioned on each side of machine 10. Each box frame 17 includes a base plate 18 having opposed side plates 19 and opposed end plates 20 (one shown) extending from the periphery thereof. One end plate 20 is attached to the top of bottom plate 11 and the other end plate (not shown) is attached to the bottom of intermediate plate 12. As such, box frames 17 support intermediate plate 12 spaced above bottom plate 11.

Top plate 13 is carried spaced from intermediate plate 12 by opposed posts 21 located between the rear corners of plates 12 and 13. If necessary, additional posts or other supports could be provided at the front corners of plates 12 and 13 as would be evident to one skilled in the art. As such, posts 21 support top plate 13 spaced above intermediate plate 12.

An agitator motor 22 is carried by top plate 13, as by bolts 23, and is thereby suspended between top plate 13 and intermediate plate 12. Motor 22 rotates a shaft 24 which carries a pulley 25. A belt 26 extends between pulley 25 and a pulley 27 carried by an agitator shaft 28. Thus, through belt 26, motor 22 turns agitator shaft 28 which extends through and downwardly from top plate 13 and which carriers a food agitator generally indicated by the numeral 30.

Agitator 30 can take on any conventional configuration but is shown as being in the shape of a spoon. As such, agitator 30 is a plastic member having a hollow stem 31 which is removably attached at one end by a coupler 32 to agitator shaft 28 and which is formed with a blade 33 in the shape of the bowl of the spoon at the other end of stem 31. Such a spoon shaped agitator and the advantages thereof are described in U.S. Pat. No. 4,946,287 which is incorporated by reference herein for whatever may be necessary for a complete understanding of the present invention.

As discussed in that patent, providing a disposable agitator 30 in the shape of a spoon offers several advantages. The fast food or other establishment having a machine 10 can inexpensively provide the customer with a spoon agitator 30, and the customer merely slides the stem 31 on the agitator shaft 28 until coupler 32 engages the shaft 28. The bowl shaped blade 33 provides an ideal mixer of food products, and when the product is blended, the user may remove the spoon agitator 30 from the shaft 28 and use it, if necessary, to eat the food. At the same time, the shaft 28 remains clean, having been covered by the stem 31, so as not to contaminate the food product of the next user of the machine and otherwise avoid the need to have an attendant clean the agitator shaft 28.

Figure 4:
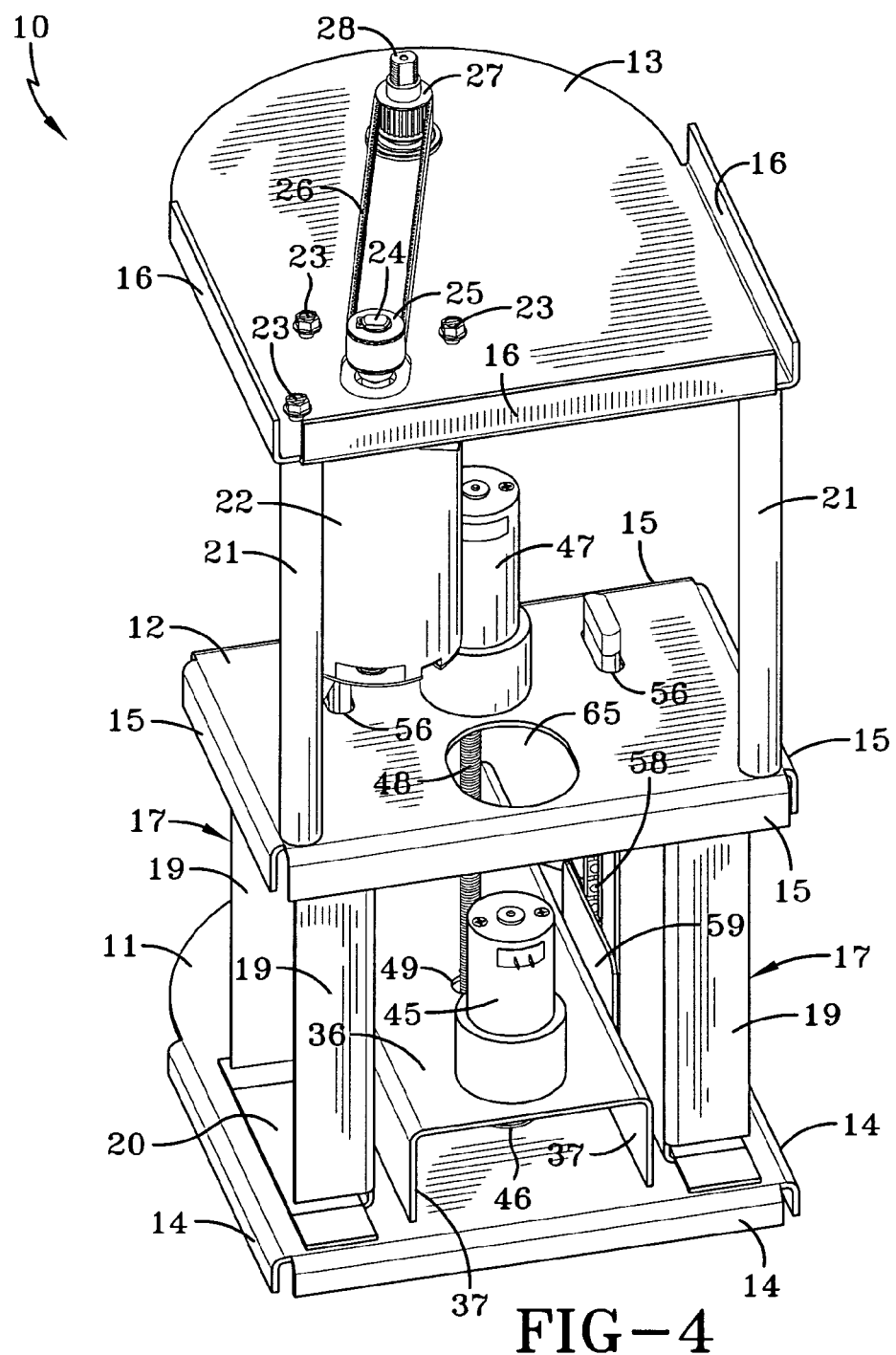
FIG. 4 is a somewhat schematic top, rear, right side perspective view of the mixing machine in the position shown in FIG. 1.

Machine 10 includes a travel plate generally indicated by the numeral 35. Travel plate 35 is generally u-shaped in configuration having a platform portion 36 and opposed branches 37 extending downwardly from the periphery of platform 36. A holder for a container such as a cup or the like is generally indicated by the numeral 38 and includes a bottom surface 39 (FIGS. 6 and 7) and cylindrical body portion 40 extending upwardly therefrom. Body portion 40 is hollow forming a somewhat tapered container-receiving opening 41 surrounded at its upper periphery by an arcuate flange 42. As best shown in FIGS. 6 and 7, a shaft 43 extends downwardly from bottom surface 39 through an opening in platform 36 of travel plate 35. Shaft 43 thus defines the axis or center of container holder 38 and carries a pulley 44. As best seen in FIG. 4, a motor 45 is carried by travel plate 35, and its shaft (not shown) extends through plate 35 and carries a pulley 46. A belt (not shown) couples pulleys 46 and 44 so that activation of motor 45 rotates shaft 43 of container holder 38, and thus container holder 38 is rotatable on its axis.

Figure 2:
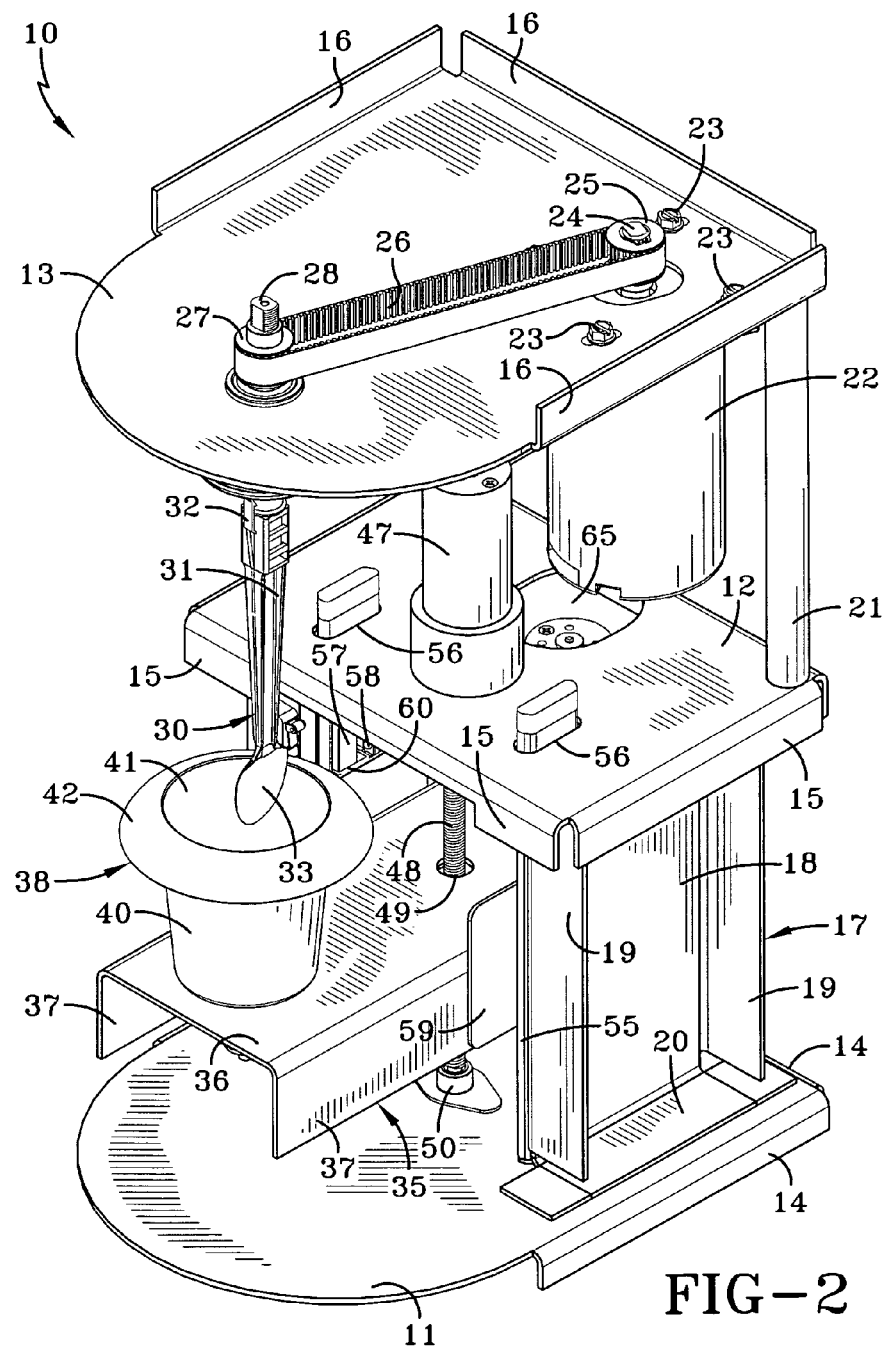
FIG. 2 is a somewhat schematic view similar to FIG. 1 but showing the machine in a position sequentially following that shown in FIG. 1 in the operation thereof.

Travel plate 35 is moveable upwardly and downwardly by a reversible motor 47 carried by intermediate plate 12. A screw shaft 48 extends downwardly from motor 47 through an opening 49 in platform 36 of travel plate 35 and into an unthreaded boss 50 (FIG. 2) carried by bottom plate 11. Screw shaft 48 is operatively connected to travel plate 35 by a threaded coupler (not shown) or the like carried below platform 46. As such, when motor 47 rotates shaft 48 in one direction, travel plate 35 moves upwardly, and when shaft 48 is rotated in the opposite direction, plate 45 moves downwardly.

During this movement, for stability, travel plate 35 is guided by opposed mechanisms generally indicated by the numeral 55. Mechanisms 55 are shown to be in the form of rails supported at the bottom by bottom plate 11 and extend through slots 56 in intermediate plate 12 for support at the top. Each rail includes a track 57 with bearings 58 communicating with the track 57. Opposed plates 59 are attached to opposed branches 37 of travel plate 35 and include a lug 60 which is received in each track 57 and schematically shown in FIG. 1. Thus, as travel plate 35 moves up and down, lugs 60, with the assistance of bearings 58, ride on tracks 57.

Figure 5:
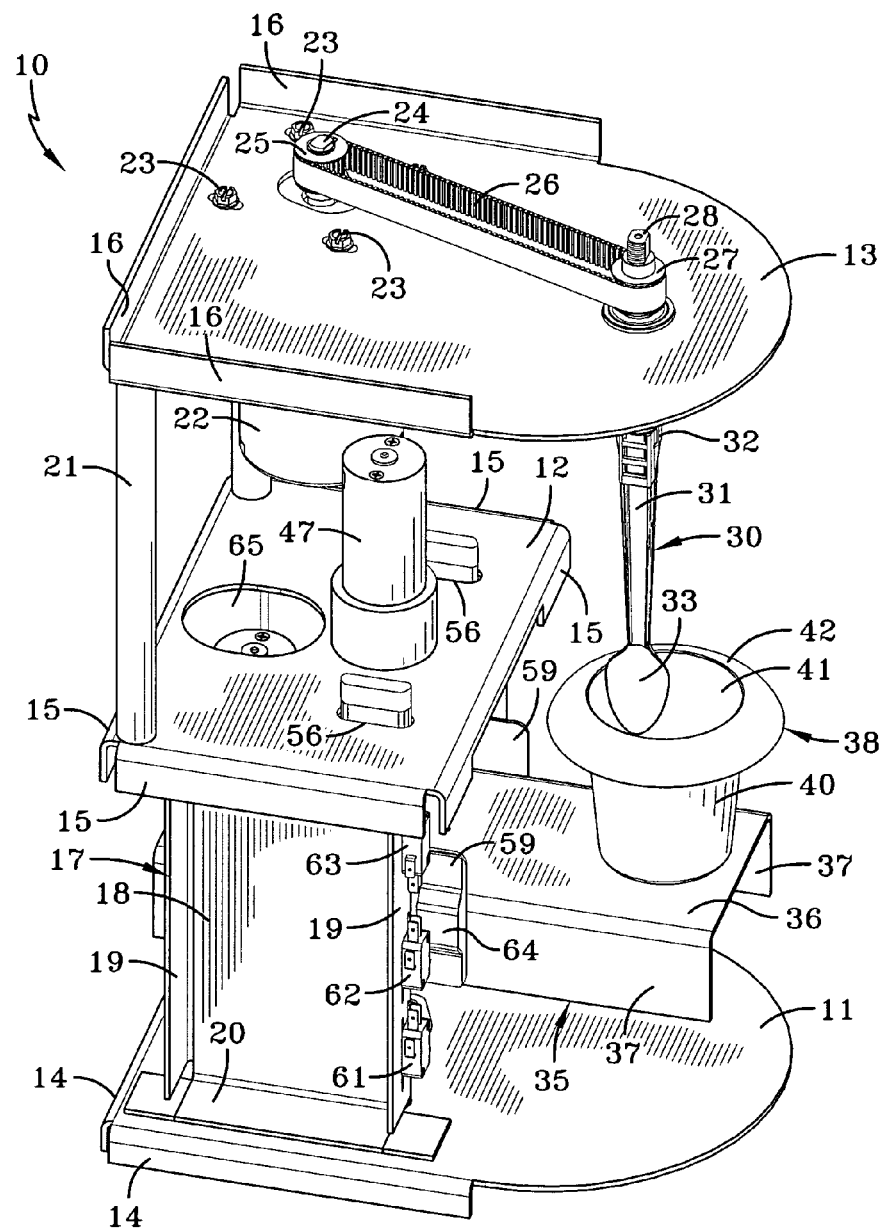
FIG. 5 is a somewhat schematic top, left side, front perspective view of the mixing machine in the position shown in FIG. 2.

As best shown in FIGS. 5 and 6, a side plate 19 of one box frame 17 carries a plurality of limit switches—a lower limit switch 61, a middle limit switch 62, and an upper limit switch 63. Limit switches 61, 62 and 63 are adapted to be engaged and operated by a tab 64 carried by the plate 59 which is adjacent to that box frame 17. The operation of machine 10 is controlled by limit switches 61, 62, and 63, as well as motors 22, 45 and 47, which are in turn preferably controlled by a programmable controller, in a manner now to be described.

The home position of machine 10 when not in use is shown in FIG. 1. In this position, travel plate 35 is all the way down as sensed by limit switch 61. In this position the user places a conventional cup or other container having the food to be mixed into container holder 38. The opening 41 of holder 38 can be sized to receive a variety of conventional cup sizes, but if special containers are being utilized, a specially configured container holder can replace the holder 38 shown.

The user then selects the program for the machine 10 and starts motor 47, as is preferably accomplished with buttons (not shown) provided on a control panel of machine 10. Upon activation, motor 47 moves plate 35 upward. When the FIG. 2 position is reached, that is, approximately at the time that agitator 30 is about to enter the container, limit switch 62 is tripped which activates motor 22 to start spinning agitator 30.

Figure 3:
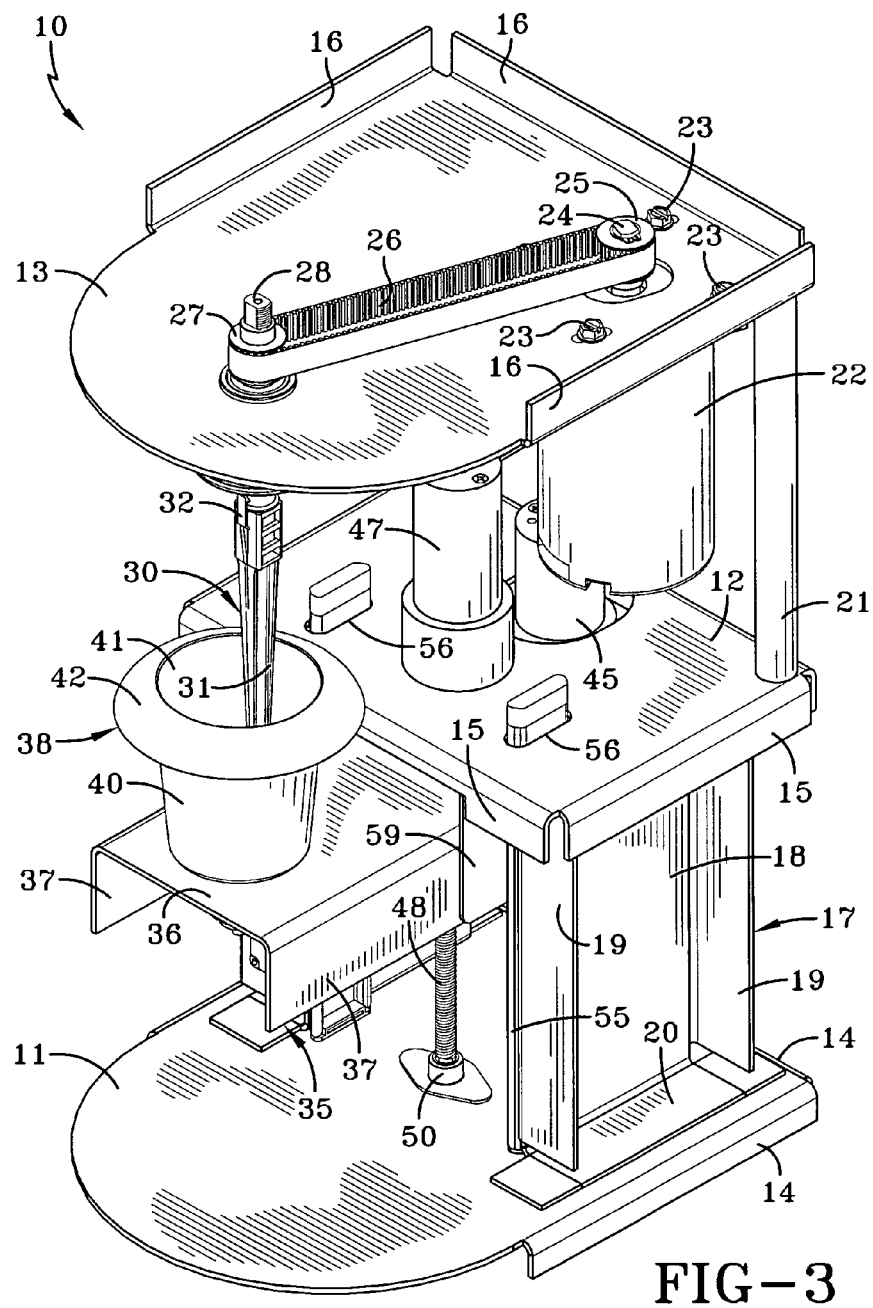
FIG. 3 is a somewhat schematic view similar to FIGS. 1 and 2 but showing the machine in a position sequentially following that shown in FIG. 2 in the operation thereof.

Further upward movement of plate 35 immerses agitator 30 in the food, and when the plate 35 reaches its upper limit, as shown in FIG. 3, with the agitator 30 near the bottom of the container (but not puncturing the bottom of the container), limit switch 63 is tripped. Such activates motor 45 which rotates container holder 38 on its axis. It should be noted that at this time, motor 45 has passed upwardly through an opening 65 provided in intermediate plate 12 for that purpose. Activation of limit switch 63 also reverses the direction of motor 47 such that travel plate 35 begins to move downwardly back to the FIG. 2 position. Dependent on how much mixing time is programmed into the controller, typically when limit switch 62 is again engaged, motor 47 will again reverse sending travel plate 35 upward. Movement between the FIG. 2 and FIG. 3 positions will continue until the controller senses that a predetermined time has lapsed to satisfactorily mix the particular food product. At that time, limit switch 62 is deactivated such that plate 35 passes by it and moves to the home position of FIG. 1 where limit switch 61 is engaged to shut down all motors. The user may then remove his container and the spoon agitator 30, as previously described, to consume his perfectly mixed food product.

As shown in the drawings, probably best in FIGS. 5 and 7, it is important to note that preferably the agitator 30 is not positioned directly on the axis of container holder 38. Thus, as shown, it is displaced from, or off-center of, that axis such that the mixing does not take place totally at the center of the container in holder 38 which was a problem of the prior art. Rather, by providing the axis of the agitator 30 somewhere between the axis of the container in the container holder 38 and the body of the container, as generally defined by the body 40 of container holder 38, complete mixing of the food product is accomplished without damage to the container.

It is also preferred that once limit switch 63 activates motor 45 to begin rotation of container holder 38, such rotation may not be continuous. That is, it is preferred that as plate 35 moves downwardly, container holder 38 is rotated, for example, only approximately ninety degrees, and such rotation is preferably stopped by the time container holder 38 reaches the FIG. 2 position. Then when the FIG. 3 position is again reached, motor 45 is again activated to rotate container holder 38 another ninety degrees while it is moving on its way down again. Using this ninety degree rotation as an example, in four reciprocations up and down, all three hundred sixty degrees of the food in the container would be assured of being exposed to the rotating agitator 30.

In view of the foregoing, it should be evident that a machine constructed and operated as described herein will completely and automatically mix a food product in a container thereby accomplishing the objects of the invention and substantially improving the art.

What is claimed is:

1. Apparatus for mixing a food product in a container comprising a travel plate, a motor to move said travel plate upwardly and downwardly, a container holder carried by said travel plate and having an axis, said container holder having a bottom surface and a body portion extending upwardly from said bottom surface and adapted to receive the container on said bottom surface and within said body portion, an agitator rotatable on an axis and initially positioned above said container holder, said motor moving said travel plate and said container holder upwardly so that said agitator is selectively positioned in the container, and means to reverse the direction of the movement of said travel plate before said agitator can engage said bottom surface, the axis of rotation of said agitator being displaced from the axis of said container holder without allowing said agitator to engage said body portion.

2. The apparatus of claim 1 further comprising a motor carried by said travel plate to rotate said container holder.

3. The apparatus of claim 1 further comprising a guide mechanism positioned adjacent to said travel plate to guide said travel plate during its upward and downward movement.

4. The apparatus of claim 1 wherein said agitator includes a rotatable shaft, a stem received on said shaft and having one end attached to said shaft, and a blade positioned on the other end of said stem, said blade configured like the bowl of a spoon.

5. The apparatus of claim 1 further comprising a first motor to selectively move said container holder upwardly and downwardly, a second motor to rotate said agitator, and a third motor to selectively rotate said container holder.

6. The apparatus of claim 5 further comprising a first switch to activate said second motor when said container holder has moved upwardly a predetermined distance, and a second switch to reverse the direction of the movement of said container holder when said container holder has moved upward to its full extent.

7. The apparatus of claim 6 wherein said second switch also activates said third motor.

8. The apparatus of claim 6 further comprising a third switch to turn off said first motor.

9. Apparatus for mixing a food product in a container comprising a container holder carried by a travel plate and having a bottom surface and a body portion extending upwardly from said bottom surface, said container holder being adapted to receive the container on said bottom surface and within said body portion, a rotatable agitator positioned above said container holder, a first motor to selectively move said container holder upwardly so that said agitator is selectively positioned in the container, a second motor to rotate said agitator, a third motor to rotate said container holder while said agitator is in the container without allowing said agitator to engage the container positioned on said bottom surface and without allowing said agitator to engage the container positioned within said body portion, a first switch to activate said second motor when said container holder has moved upwardly a predetermined distance, and a second switch to reverse the direction of the movement of said container holder when said container holder has moved upward to its full extent.

10. The apparatus of claim 9 further comprising a motor to rotate said agitator on an axis, said container holder having an axis which is displaced from the axis of rotation of said agitator when said agitator is positioned in the container.

11. The apparatus of claim 9 further comprising a guide mechanism positioned adjacent to said travel plate to guide said travel plate during its upward and downward movement.

12. The apparatus of claim 9 wherein said agitator includes a rotatable shaft, a stem received on said shaft and having one end attached to said shaft, and a blade positioned on the other end of said stem, said blade configured like the bowl of a spoon.

13. The apparatus of claim 9 wherein said second switch also activates said third motor.

14. The apparatus of claim 9 further comprising a third switch to turn off said first motor.

15. Apparatus for mixing a food product in a container comprising a travel plate, a container holder attached to said travel plate and adapted to receive the container, an agitator initially positioned above said container holder, a first motor to selectively move said container holder upwardly from a first position to a second position and downwardly from said second position to said first position, a second motor to rotate said agitator, a first switch positioned adjacent to said travel plate, a second switch positioned adjacent to said travel plate, and a tab carried by said travel plate, said tab engaging said first switch to activate said second motor when said travel plate has moved upwardly a predetermined distance and engaging said second switch to reverse the direction of the movement of said travel plate when said travel plate has reached said second position.

16. Apparatus for mixing a food product in a container comprising a travel plate, a container holder carried by said travel plate and having a bottom surface and a body portion extending upwardly from said bottom surface, a motor to selectively move said container holder upwardly, and a switch to reverse the direction of movement of said container holder when said container holder has moved upward to its full extent, said container holder being adapted to receive the container on said bottom surface and within said body portion, and a rotatable agitator positioned above said container holder, said motor moving said container holder upwardly so that said agitator is selectively positioned in the container and being rotatable while said agitator is in the container without allowing said agitator to engage the container positioned on said bottom surface and without allowing said agitator to engage the container positioned within said body portion.

* * * * *